Figure 1:
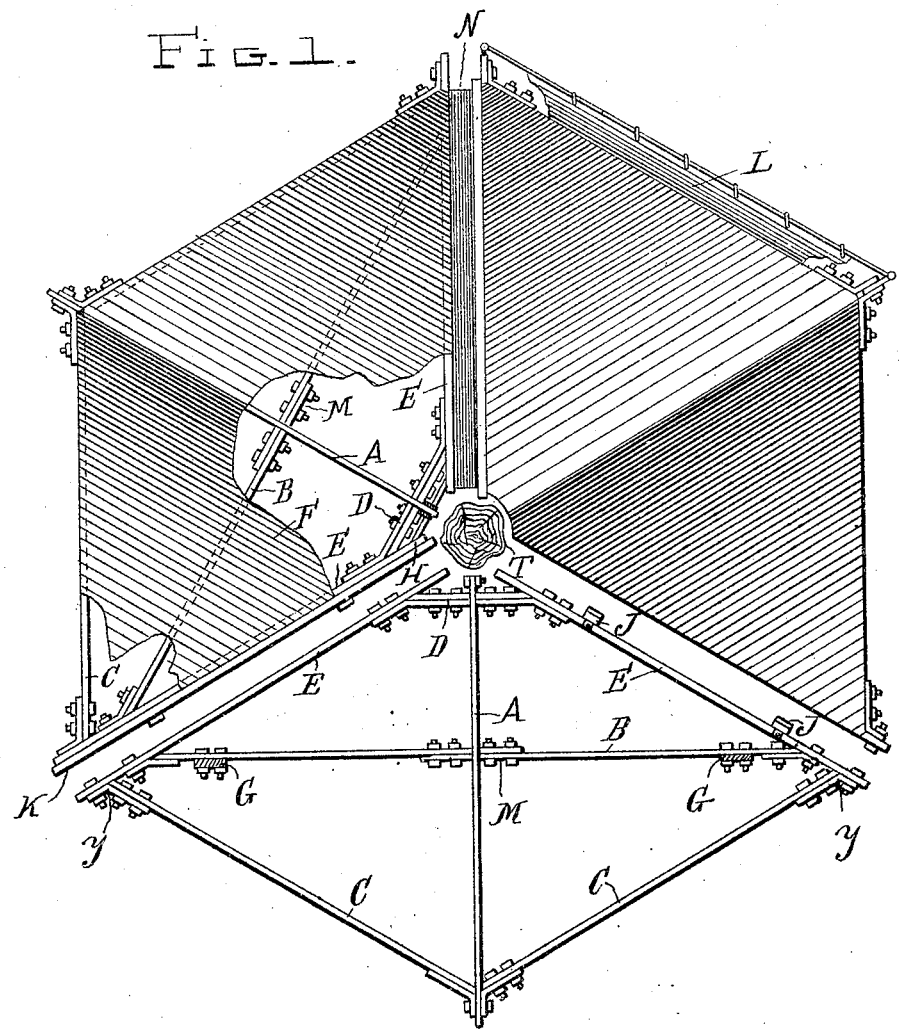

No. 804,974. PATENTED NOV. 21, 1905.
M. L. PORTER.
FRUIT HARVESTER.
APPLICATION FILED DEC. 14, 1903.

3 SHEETS—SHEET 1.

Witnesses
Jas. A. Koehl.
[signature]

Inventor
Martin Luther Porter.
by H. B. Willson
Attorney

No. 804,974. PATENTED NOV. 21, 1905.
M. L. PORTER.
FRUIT HARVESTER.
APPLICATION FILED DEC. 14, 1903.
3 SHEETS—SHEET 2.
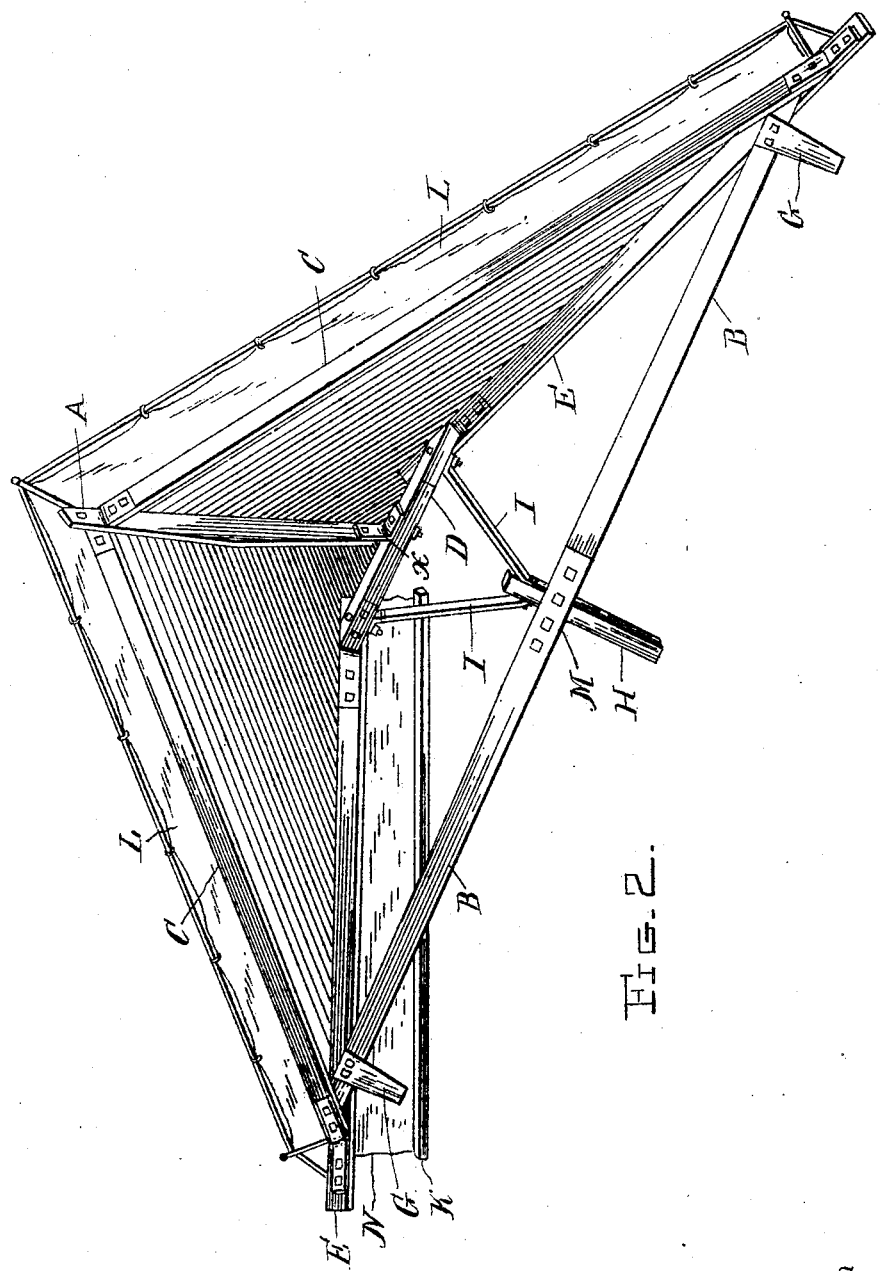
Inventor
Martin Luther Porter.
by H. B. Willson
Attorney
Witnesses
Jas. A. Koehl.
E. K. Dwyer.

No. 804,974. PATENTED NOV. 21, 1905.
M. L. PORTER.
FRUIT HARVESTER.
APPLICATION FILED DEC. 14, 1903.
3 SHEETS—SHEET 3.
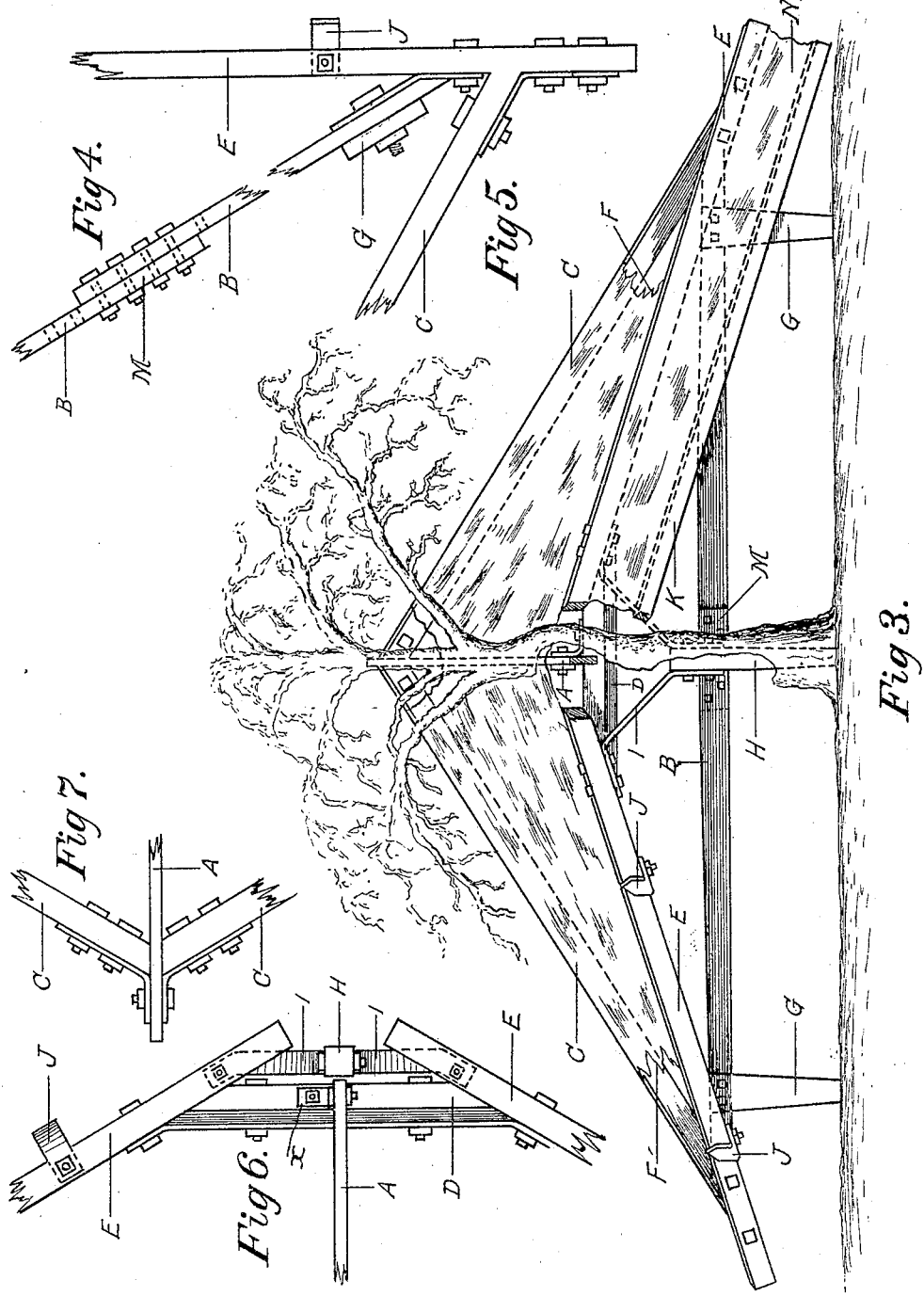
WITNESSES:
INVENTOR.
Marlin Luther Porter
BY
ATTORNEYS.

UNITED STATES PATENT OFFICE.

MARTIN LUTHER PORTER, OF REDDING, CALIFORNIA, ASSIGNOR TO JAMES MONROE GRAHAM, ZACHARIAH FLETCHER WHARTON, AND BENJAMIN FRANKLIN HOWARD, OF SACRAMENTO, CALIFORNIA.

FRUIT-HARVESTER.

No. 804,974.     Specification of Letters Patent.     Patented Nov. 21, 1905.

Application filed December 14, 1903. Serial No. 185,180.

To all whom it may concern:

Be it known that I, MARTIN LUTHER PORTER, a citizen of the United States, and a resident of Redding, in the county of Shasta and State of California, have invented certain new and useful Improvements in Fruit-Gatherers, of which the following is a specification.

My invention relates to fruit-gatherers; and the principal object of the same is to provide means for catching the fruit as it drops from the tree and running it off by gravity into boxes or crates without permitting the fruit to fall to the ground and become bruised and injured.

Another object is to provide a flexible apron to be supported upon a frame to be placed under and around a tree to catch the fruit as it is shaken from the tree and run it off into crates or boxes.

Still another object is to provide a device of this character which will be simple in construction, efficient in operation, which can be quickly placed in position around the trunk of the tree, and which can be produced at slight cost.

These and other objects are attained by means of the construction illustrated in the accompanying drawings, in which—

Figure 1 is a partial plan view of a fruit-gatherer made in accordance with my invention, the canvas cover being partially broken away in one of the sections or members of the gatherer and entirely removed from another section of the same in order that the framework of the gatherer may be seen, certain parts being shown in dotted lines and other parts being removed. Fig. 2 is a detail perspective view of a portion of one of the sections or members of the device of slightly-modified construction. Fig. 3 is a detail side elevation and partial section of one of the sections or members of the device in position for use at the trunk of a tree. Fig. 4 is a detail plan view of the adjusting means for one of the braces of the frame. Fig. 5 is a similar view of another part of the framework. Fig. 6 is a fragmentary plan view of certain parts of the framework, and Fig. 7 is a like view of still another part of the framework.

Referring to the drawings for a more particular description of the invention, it will be understood that my fruit-gatherer is made up of separable sections of identical construction and that, as shown, three sections are utilized, said sections being connected together and surrounding the trunk of a tree. As these sections are identical in construction, only one will be described, it being understood that a description of one will answer for all.

The framework of each section is made up of a ridge-pole A, an adjustable brace B, outer frame-bars C, a short brace D, and inner frame-bars E. The ridge-pole A extends outward and upward from the tree T and is supported by a leg H at its inner end, said leg being connected to the two diverging braces I, said braces being connected at their upper ends to the brace D, as shown in Fig. 2, or to the inner frame-bars E. To the brace D the end of the ridge-pole A is secured by means of a metal foot-bracket $x$.

The brace B is made of two sections having registering bolt-holes in their inner ends to form an extension-joint M to permit adjustment of the brace. The outer frame-bars C are each connected at one end to the outer end of the ridge-pole A, while their opposite ends are connected to the inner frame-bars E by means of suitable brackets or straps $y$, as shown in Fig. 1. Secured to the bars E at suitable points are a number of hooks J, the purpose of which will presently appear. Short legs G are secured near the opposite ends of the adjustable brace B. A canvas cover F is secured in any suitable manner to the bars E, said cover being passed over the ridge-pole A, as shown. Secured to the outer bars C are canvas troughs L, there being two such troughs for each section of the gatherer. When the three sections of the gatherer are placed in position around the trunk of a fruit-tree, said sections are connected together at their meeting edges by means of suitably-constructed canvas discharge-troughs N, which, as shown, each consists of a strip of canvas secured at one edge to one of the frame-bars E, while the opposite edge is secured to a wooden bar or strip K, designed to be supported upon the hooks J on the contiguous frame-bar E.

When the gatherer is in place, it will be noticed that the ridge-poles A in the center of each section hold the canvas cover up, while the cover at opposite sides of the center inclines downward to the discharge-troughs. When the fruit-tree is shaken, the fruit falls upon the cover and rolls down the inclined walls to the troughs N or to the troughs L, and the latter incline toward the former and discharge their contents into boxes or crates placed at the discharge ends of the troughs to catch the fruit.

My fruit-gatherer is simple in construction, efficient in operation, can be quickly assembled in position for use, and can be quickly taken apart and packed within a small space for storage or shipping.

Various changes in the form, proportion, and the minor details of construction may be resorted to without departing from the principle or sacrificing any of the advantages of this invention.

Having thus described my invention, what I claim as new, and desire to secure by Letters Patent, is—

1. A fruit-gatherer made in detachable sections, each section comprising an inclined ridge-pole, an adjustable brace, outer and inner frame-bars, a canvas cover for each section, flexible troughs surrounding the gatherer, and discharge-troughs detachably connected to one section and fixed to the other section, said troughs being disposed intermediate the sections, substantially as described.

2. A fruit-gatherer comprising detachable sections, covered with canvas and provided with inclined portions, flexible troughs surrounding the gatherer, and discharge-troughs intermediate the sections said troughs being secured to one of the sections and detachably secured to the other contiguous section, all the portions of the gatherer inclining toward the discharge end of said discharge-trough, substantially as described.

3. In a fruit-gatherer, separable sections covered with canvas, said sections each comprising a supporting-frame having a central ridge-pole inclined outwardly and upwardly, an adjustable brace-bar, frame-bars connected to the ridge-pole, hooks connected to one of the inner frame-bars of each section, and discharge-troughs supported by the hooks, substantially as described.

In testimony whereof I have signed my name to this specification, in the presence of two subscribing witnesses, this 3d day of December, 1903.

MARTIN LUTHER PORTER.

Witnesses:
GEORGE O. PERRY,
WILLIAM CAMPBELL.